(12) United States Patent
Zhao et al.

(10) Patent No.: US 10,831,054 B2
(45) Date of Patent: Nov. 10, 2020

(54) DISPLAY PANEL AND DISPLAY APPARATUS (71) Applicant: BOE Technology Group Co., Ltd., Beijing (CN)

(72) Inventors: Weili Zhao, Beijing (CN); Zhongxiao Li, Beijing (CN); Wenqing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 35 days.

(21) Appl. No.: 16/146,088

(22) Filed: Sep. 28, 2018

(65) Prior Publication Data

US 2019/0101788 A1 Apr. 4, 2019

(30) Foreign Application Priority Data

Sep. 29, 2017 (CN) .......................... 2017 1 0910733

(51) Int. Cl.
*G02F 1/1335* (2006.01)
*G02F 1/1343* (2006.01)
(Continued)

(52) U.S. Cl.
CPC .. *G02F 1/133512* (2013.01); *G02F 1/134309* (2013.01); *G02F 1/29* (2013.01);
(Continued)

(58) Field of Classification Search
CPC ......... G02F 1/133512; G02F 1/134309; G02F 1/29; G02F 2001/133565; G02F 2001/134345; G02F 2001/133357
(Continued)

(56) References Cited

U.S. PATENT DOCUMENTS

2009/0296032 A1* 12/2009 Tago ..................... G02F 1/1337
349/116
2010/0053727 A1* 3/2010 Lee ......................... G02B 26/02
359/295
(Continued)

FOREIGN PATENT DOCUMENTS

CN 103309117 A 9/2013
CN 105549266 A 5/2016
(Continued)

OTHER PUBLICATIONS

First Office Action dated Nov. 12, 2019 corresponding to Chinese application No. 201710910733.2.

*Primary Examiner* — Charles S Chang
(74) *Attorney, Agent, or Firm* — Nath, Goldberg & Meyer; Joshua B. Goldberg (57) ABSTRACT

A display panel and a display apparatus are provided. The display panel comprises a first substrate, a refractive index adjustment mechanism and a second substrate successively arranged along a light output direction, a first black matrix is formed on the first substrate and includes first shading portions and first openings, and a second black matrix is formed on the second substrate and includes second shading portions and second openings. The first shading portions are arranged opposite to the corresponding second openings, and the second shading portions are arranged opposite to the corresponding first openings. In the case where the display panel is in a power-off state, light cannot penetrate the display panel. In the case where the display panel is in a power-on state, the refractive index adjustment mechanism can adjust intensity of light exiting from the second openings.

14 Claims, 3 Drawing Sheets

(51) Int. Cl.
*G02F 1/29* (2006.01)
*G02F 1/1333* (2006.01)

(52) U.S. Cl.
CPC ............ *G02F 2001/133357* (2013.01); *G02F 2001/133565* (2013.01); *G02F 2001/134345* (2013.01)

(58) Field of Classification Search
USPC ................................................. 349/110–111
See application file for complete search history.

(56) References Cited

U.S. PATENT DOCUMENTS

| | | | | |
|---|---|---|---|---|
| 2013/0155504 A1* | 6/2013 | Kim | ................... | G02B 27/2214 359/464 |
| 2014/0002776 A1* | 1/2014 | Kim | .................... | G02B 5/3083 349/106 |
| 2017/0062528 A1* | 3/2017 | Aoyama | ............. | H01L 27/3246 |

FOREIGN PATENT DOCUMENTS

| CN | 106526942 A | 3/2017 |
|---|---|---|
| CN | 106707608 A | 5/2017 |
| CN | 106773218 A | 5/2017 |
| CN | 106802520 A | 6/2017 |
| KR | 1020080060872 A | 7/2008 |

\* cited by examiner

DISPLAY PANEL AND DISPLAY APPARATUS

CROSS REFERENCE TO RELATED APPLICATIONS

The present application claims the priority of the Chinese Patent Application No. 201710910733.2, filed on Sep. 29, 2017, to the Chinese Intellectual Property Office, the contents of which are incorporated herein in their entirety by reference

TECHNICAL FIELD

The present disclosure relates to the field of display technology, and in particular to a display panel and a display apparatus.

BACKGROUND

An existing Thin Film Transistor-Liquid Crystal Display (TFT-LCD) has become a mainstream display of the new generation, and reflects advantages of the liquid crystal display.

SUMMARY

The present disclosure provides a display panel and a display apparatus.

In one aspect, the display panel includes a first substrate, a refractive index adjustment mechanism and a second substrate successively arranged along a light output direction, a first black matrix is formed on the first substrate, the first black matrix includes a plurality of first shading portions and a plurality of first openings among the plurality of first shading portions; a second black matrix is formed on the second substrate, the second black matrix includes a plurality of second shading portions and a plurality of second openings among the plurality of second shading portions, the plurality of first shading portions are configured to be arranged opposite to the plurality of second openings in the light output direction, respectively, and the plurality of second shading portions are configured to be arranged opposite to the plurality of first openings in the light output direction, respectively; and the refractive index adjustment mechanism is configured to adjust an amount of light exiting from at least one of two second openings closest to a first opening from which the light is incident.

In an embodiment, a center of the first opening and a center of its corresponding second shading portion are in a same straight line in the light output direction.

In an embodiment, the first substrate, the refractive index adjustment mechanism and the second substrate are substantially parallel to each other.

In an embodiment, the first black matrix is arranged between the first substrate and the refractive index adjustment mechanism, and/or the second black matrix is arranged between the second substrate and the refractive index adjustment mechanism.

In an embodiment, the refractive index adjustment mechanism includes a first electrode, a second electrode and a liquid crystal layer arranged between the first electrode and the second electrode.

In an embodiment, the first electrode is arranged between the first black matrix and the liquid crystal layer, and the second electrode is arranged between the second black matrix and the liquid crystal layer.

In an embodiment, a width b of each of the plurality of second shading portions meets:

$$b \geq a + 2*h*\tan \theta 1,$$

where a is a width of each of the plurality of first openings; h is a distance between the first black matrix and the second black matrix in the light output direction; $\theta 1$ is an angle between an incident light passing through the first opening and an output light deflected by liquid crystal molecules in the liquid crystal layer in an original state when the display panel is in a power-off state.

In an embodiment, a is in a range of from 3 μm to 20 μm.

In an embodiment, the first electrode includes a plate-shaped electrode, and the second electrode includes a plurality of strip-shaped sub-electrodes.

In an embodiment, the first electrode includes a plurality of strip-shaped sub-electrodes, and the second electrode includes a plate-shaped electrode.

In an embodiment, the liquid crystal molecules in the liquid crystal layer are blue phase liquid crystal molecules.

In an embodiment, the plurality of strip-shaped sub-electrodes are distributed uniformly.

In an embodiment, voltages applied to the strip-shaped sub-electrodes between centers of two adjacent second openings gradually decrease in each of two directions from a center of the second shading portion between the two adjacent second openings to centers of the two adjacent second openings.

In an embodiment, a cell region between centers of two adjacent second openings is divided into a first region having a first width and two second regions each having a second width; the first region is in the middle of the cell region, the two second regions are symmetrically located at both sides of the first region, and the first width is less than the second width; and the strip-shaped sub-electrodes are distributed uniformly in the first region in a first density and are distributed uniformly in the second regions in a second density, and the first density is larger than the second density.

In an embodiment, voltages applied to the strip-shaped sub-electrodes in the first region gradually increase in directions from a center of the first region to edges of the first region, while voltages applied to the strip-shaped sub-electrodes in the second region gradually decrease in a direction from the edge of the first region to a center of the second opening closest thereto.

In an embodiment, a first planarization layer is provided between the first electrode and the first black matrix.

In an embodiment, a second planarization layer is provided between the second black matrix and the second electrode.

In an embodiment, an interval between the centers of the two adjacent second openings is in a range from 30 μm to 300 μm.

In an embodiment, the display panel further includes a driving circuit for applying a voltage between the first electrode and the second electrode.

In another aspect, the present disclosure provides a display apparatus, which includes a backlight, and the above display panel, and the backlight is located at a side of the first substrate distal to the second substrate, for providing light to the display panel.

BRIEF DESCRIPTION OF DRAWINGS

Drawings are provided to make a person skilled in the art better understand the present disclosure, and constitute a part of the description. The drawings are used to interpret the present disclosure together with embodiments of the present disclosure, and will not limit the present disclosure.

DETAIL DESCRIPTION OF EMBODIMENTS

A display panel of the present disclosure will be described in detail below in conjunction with the accompanying drawings such that a person skilled in the art can understand the technical solution of the present disclosure better.

Figure 1:
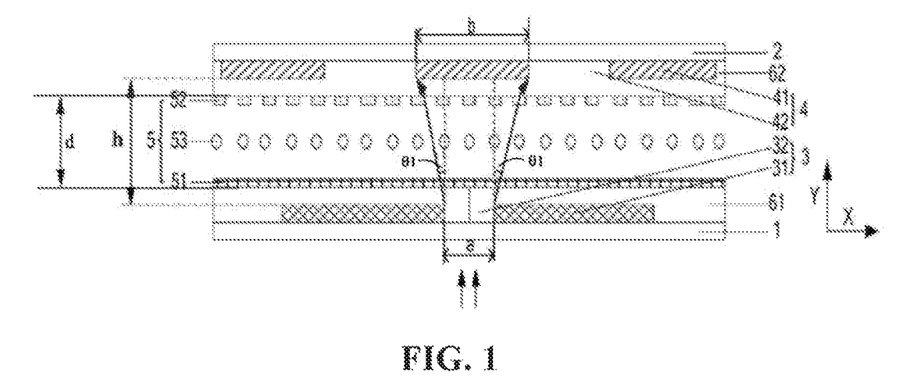
FIG. 1 is a schematic diagram of a display panel in a power-off state according to an embodiment of the present disclosure.

FIG. 1 is a schematic diagram of a display panel in a power-off state according to an embodiment of the present disclosure. As shown in FIG. 1, the display panel includes a first substrate 1, a refractive index adjustment mechanism 5 and a second substrate 2 successively arranged along a light output direction (Y direction). A first black matrix 3 is formed on the first substrate 1 and includes first shading portions 31 and first openings 32; a second black matrix 4 is formed on the second substrate 2 and includes second shading portions 41 and second openings 42. The first shading portion 31 is arranged opposite to its corresponding second opening 42, and the second shading portion 41 is arranged opposite to its corresponding first opening 32.

As shown in FIG. 1, an orthographic projection of the second shading portion 41 on the first substrate 1 completely covers an orthographic projection of its corresponding first opening 42 on the first substrate 1, and an orthographic projection of the first shading portion 31 on the second substrate 2 completely covers an orthographic projection of the second opening 43 on the second substrate 2.

In the case where the display panel is in a power-off state, incident light passes through the first opening 32 and is refracted by the refractive index adjustment mechanism 5, and due to a low refractive index of the refractive index adjustment mechanism 5, the incident light cannot exit from the second openings 42 after passing through the refractive index adjustment mechanism 5.

In the case where the display panel is in a power-on state, the incident light passes through the first opening 32 and is refracted by the refractive index adjustment mechanism 5, and the refractive index of the refractive index adjustment mechanism 5 is adjusted under an electric field which is generated under a power supplied to the refractive index adjustment mechanism 5, such that the incident light exits from the second openings 42 at refraction angles different from those in the power-off state.

In the case where the display panel is in the power-off state (i.e. no power is supplied to the refractive index adjustment mechanism 5), since the first shading portions 31 are respectively arranged opposite to the second openings 42 and the second shading portions 41 are respectively arranged opposite to the first openings 32, and the refractive index of the refractive index adjustment mechanism 5 is very small in the power-off state, the light passing through the first opening 32 cannot penetrate the display panel to exit from the second opening 42, thereby the display panel is in a dark state. In the case where the display panel is in the power-on state, the incident light can exit from the second openings 42, thus the display panel is in a bright state. At this time, the refractive index of the refractive index adjustment mechanism 5 is adjusted under the electric field generated by the power supplied across the refractive index adjustment mechanism 5, thus adjusting a direction of the light exiting from the second opening 42 after passing through the refractive index adjustment mechanism 5, controlling an amount of rays in the light exiting from the second openings 42, thereby adjusting light intensity.

The display panel according to the embodiment of the present disclosure includes a first substrate 1, a refractive index adjustment mechanism 5 and a second substrate 2 successively arranged along the light output direction, i.e. the Y direction. A first black matrix 3 is formed on the first substrate 1, and includes first shading portions 31 and first openings 32; a second black matrix 4 is formed on the second substrate 2, and includes second shading portions 41 and second openings 42. The first shading portions 31 are arranged opposite to the corresponding second openings 42, respectively, and the second shading portions 41 are arranged opposite to the corresponding first openings 32, respectively. In the case where the display panel is in the power-off state, the light cannot penetrate the display panel, thus the display panel is in the dark state. In the case where the display panel is in the power-on state, the refractive index adjustment mechanism 5 can adjust the propagation direction of light passing through the first opening 32, control the amount of rays in the light exiting from the second opening 42 closest to the first opening 32, and accordingly, adjust light intensity of the light exiting from the second opening 42. That is, the display panel is in the bright state. In this case, it is not required to further provide additional top and bottom polarizers for the display panel according to the embodiment of the present disclosure, which can thus improve utilization of a backlight, correspondingly increase brightness of a display screen, and simplify a structure of the display panel and correspondingly reduce the manufacturing cost.

It is noted that, the refractive index adjustment mechanism 5 may control the light passing through the first opening 32 to exit from one second opening 42 closest to the first opening 32, and may also control the light passing through the first opening 32 to exit from both second openings 42 closest to the first opening 32. In the latter case, there are more rays in the light exiting from the second openings. Thus, the latter case is used as an example to illustrate the embodiment of the present disclosure, such that in the embodiment of the present disclosure, the amount of the rays of the light exiting from the second openings 42 is more, thereby improving the brightness of the display screen.

In the embodiment as shown in FIG. 1, a center of the first opening 32 and a center of the corresponding second shading portion 41 are in a same straight line along the light output direction (that is, vertical to the first substrate 1). That is, distances from centers of two second openings 42 closest to the first opening 32 to the straight line are identical. In other words, the distances from the center of the first opening 32 to the centers of the two second openings 42 closest to the first opening 32 in a horizontal direction (X direction) are identical, such that the amounts of the rays of the light passing through the first opening 32 and exiting from the two second openings 42 closest to the first opening 32 are identical. That is, light intensity of the exiting light from the two second openings 42 are the same, thereby achieving uniform brightness of the display screen.

Thereafter, a specific structure and an operating principle for the refractive index adjustment mechanism 5 will be described in detail below in conjunction with the accompanying drawings.

As shown in FIG. 1, the refractive index adjustment mechanism 5 may include a first electrode 51, a second electrode 52 and a liquid crystal layer 53 arranged between the first substrate 1 and the second substrate 2, the first electrode 51 is arranged on the first substrate 1, and the second electrode 52 is arranged on the second substrate 2.

In an embodiment of the present disclosure, the first electrode 51 may include a plurality of strip-shaped sub-electrodes, and the second electrode 52 includes a plate-shaped electrode. In an embodiment of the present disclosure, the first electrode 51 includes a plate-shaped electrode, and the second electrode 52 includes a plurality of strip-shaped sub-electrodes, as shown in FIG. 1. In this way, in the case where the display panel is in the power-on state, an intensity of an electric field between the second electrode 52 and the first electrode 51 is controlled by controlling a voltage applied to the second electrode 52 to cause liquid crystal molecules in the liquid crystal layer 53 to deflect, for adjusting the refractive index of the liquid crystal molecules between the second electrode 52 and the first electrode 51, such that all light exiting from the liquid crystal layer 53 along different directions may exit from the second openings 42, thereby improving the brightness of the display screen. And the higher the voltage applied to the second electrode 52 is, the stronger the generated electric field is, thus the liquid crystal molecules deflect greater.

In an embodiment of the present disclosure, the first electrode 51 may be arranged on a side of the first black matrix 3 proximal to the first substrate 1 (that is, the first electrode 51 may be arranged between the first black matrix 3 and the first substrate 1), and/or, the second electrode 52 may be arranged on a side of the second black matrix 4 proximal to the second substrate 2 (that is, the second electrode 52 may be arranged between the second black matrix 4 and the second substrate 2). In an embodiment of the present disclosure, the first electrode 51 may be arranged on a side of the first black matrix 3 distal to the first substrate 1, and/or, the second electrode 52 may be arranged on a side of the second black matrix 4 distal to the second substrate 2, as shown in FIG. 1. In this way, the first electrode 51 and the second electrode 52 are close to the liquid crystal layer 53, such that in the power-on state, the electric field generated between the first electrode 51 and the second electrode 52 may better control the deflection of the liquid crystal molecules in the liquid crystal layer 53.

In an embodiment of the present disclosure, the liquid crystal molecules in the liquid crystal layer 53 are blue phase liquid crystal molecules. As shown in FIG. 1, the blue phase liquid crystal molecules in an original state are substantially circular, the circular blue phase liquid crystal molecules are isotropic, and the refractive indexes thereof in the X and Y directions are identical and small. In this case, the liquid crystal molecules may be considered as a normal optical dielectric layer, and the incident light from a light source passes through the optical dielectric layer containing the liquid crystal molecules and hits on the second shading portion 41.

The first black matrix 3 includes the first shading portions 31 and the first openings 32, in this case, if the first electrode 51 is directly formed on the first black matrix 3, there will be a height difference on a surface of the first electrode 51, which will adversely affect the uniformity of the generated electric field between the first electrode 51 and the second electrode 52 in the power-on state. In order to avoid this case, as shown in FIG. 1, a first planarization layer 61 is provided between the first electrode 51 and the first black matrix 3, and similarly, a second planarization layer 62 is provided between the second black matrix 4 and the second electrode 52.

Specifically, as shown in FIG. 1, when the display panel is in the power-off state, the liquid crystal molecules in the liquid crystal layer 53 are in an original state, and at this time, the refractive indexes thereof are small. Let an angle between an incident light passing through the first opening 32 and the output light deflected to the greatest extent by the liquid crystal molecules when the display panel is in the power-off state be $\theta 1$ in the case that centers of the second shading portion 41 and the corresponding first opening 32 are in a same straight line vertical to the first substrate 1, in order to ensure that the second shading portions 41 fully block the incident light passing through the first opening 32 when the display panel is in the power-off state, a width b of each of the second shading portions 41 should meet:

$$b \geq a + 2*h*\tan \theta 1 \qquad (1)$$

where a is a width of the first opening 32; h is a distance between the first black matrix 3 and the second black matrix 4.

FIG. 1 is only a schematic view. In fact, although the liquid crystal molecules in the original state has very small refractive indexes, the incident light is refracted several times and then exit from the second opening 42.

In an embodiment of the present disclosure, a distance P between centers of two adjacent second openings 42 may be in a range from 30 μm to 300 μm. For the purpose of improving the brightness of the display screen, in an embodiment of the present disclosure, a ranges from 3 μm to 20 μm.

Figure 2:
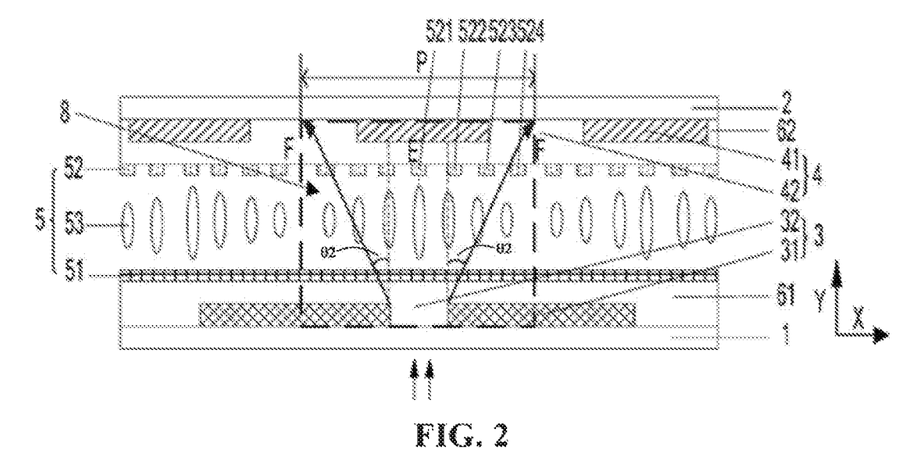
FIG. 2 is a schematic diagram of a display panel in a power-on state according to an embodiment of the present disclosure.

FIG. 2 is a schematic diagram of the display panel in the power-on state according to an embodiment of the present disclosure, which shows an exemplary structure and a driving method for the second electrode 52. When the display panel is in the power-on state, that is, with a driving circuit (as labeled as 10 in FIG. 6), a voltage difference is applied between the first electrode 51 and the second electrode 52 for generating an electric field therebetween, and a direction of the electric field is along the Y axis. The electric field causes the liquid crystal molecules in the liquid crystal layer 53 to deflect, such that the liquid crystal layer 53 may deflect some rays in the incident light towards a direction (X direction) perpendicular to the direction of the electric field (Y direction). Let an angle between an incident light passing through the first opening 32 and the light deflected by the liquid crystal molecules to exit from the second openings 42 closest to the first opening 32 when the display panel is in the power-on state be $\theta 2$, $\theta 2$ is greater than $\theta 1$, thus some rays in the incident light passing through the first opening 32 may exit from the second opening 42.

As shown in FIG. 2, with the electric field generated between the first electrode 51 and the second electrode 52, blue phase liquid crystal molecules are stretched to be elliptical; the elliptical blue phase liquid crystal molecules are anisotropic and have characteristics of birefringence, thus will make the light refracted by a larger refraction angle. That is, the light is caused to deflect towards the X direction, such that more light can exit from the second openings 42, improving the brightness of the display screen.

In an embodiment of the present disclosure, as shown in FIG. 2, the plurality of strip-shaped sub-electrodes of the second electrode 52 are distributed uniformly on the second substrate 2, such that more incident light through each of the first openings 32 can exit from two second openings 42 closest to the first opening 32, thus further improving the brightness of the display screen.

As shown in FIG. 2, a center of the second shading portion 41 is labeled as a first location E, a center of the second opening 42 is labeled as a second location F, a distance between two adjacent second locations F is P. In the direction from the first location E to each second location F, voltages applied to the plurality of strip-shaped sub-electrodes of the second electrode 52 gradually decrease, such that the refractive indexes in the Y direction (the light output direction) of the liquid crystal molecules gradually decrease, while the refractive indexes in the X direction (the direction vertical to the light output direction) gradually increase, so that optical paths of the light in the liquid crystal molecules gradually increase from the first location E to the second location F, since the equivalent light path in the X direction equals to a product of the refractive index in the X direction and a thickness of the liquid crystal cell, thus causing more light to exit from the two adjacent second openings 42.

As enclosed by dotted lines shown in FIG. 2, a pixel unit 8 is arranged between centers of two adjacent second openings 42, and a width thereof is equal to P. A center line of the pixel unit 8 passes through the first location E, and edges of the pixel unit 8 pass through the two second locations F. Next, a pixel unit is illustrated as an example.

In an embodiment of the present disclosure, in the pixel unit 8, in a direction from the first location E to the second location F, the second electrode 52 includes a first strip-shaped sub-electrode 521, a second strip-shaped sub-electrode 522, a third strip-shaped sub-electrode 523 and a fourth strip-shaped sub-electrode 524 sequentially. When the display panel is in the power-on state, voltages applied to the respective strip-shaped sub-electrodes of the second electrode 52 meet: a voltage V1 applied to the first strip-shaped sub-electrode 521 is greater than a voltage V2 applied to the second strip-shaped sub-electrode 522, which is in turn greater than a voltage V3 applied to the third strip-shaped sub-electrode 523, which is in turn greater than a voltage V4 applied to the fourth strip-shaped sub-electrode 524, such that an intensity of electric field E1 generated between the first strip-shaped sub-electrode 521 and the first electrode 51 is greater than that of electric field E2 generated between the second strip-shaped sub-electrode 522 and the first electrode 51, which is greater than that of electric field E3 generated between the third strip-shaped sub-electrode 523 and the first electrode 51, which is greater than that of electric field E4 generated between the fourth strip-shaped sub-electrode 524 and the first electrode 51.

According to Kerr effect, a refractive index n in the Y direction of the liquid crystal molecules is:

$$n = KE^2 \tag{2}$$

where K is kerr coefficient; E is intensity of electric field.

It can be seen from equation (2), that the larger the intensity E of electric field is, the greater the refractive index n in the Y direction of the liquid crystal molecules is. Because the liquid crystal molecules are now anisotropic, the greater the refractive index n in the Y direction of the liquid crystal molecules is, and the less the refractive index n in the X direction of the liquid crystal molecules is.

An equivalent optical path $\phi$ of light in the X direction is given by:

$$\phi = n*d \tag{3}$$

where n is a refractive index in the X direction of the liquid crystal molecules; d is a thickness of the liquid crystal cell.

It can be seen from equation (3) that, the less the refractive index n in the X direction of the liquid crystal molecules is, the less the optical path $\phi$ in the X direction of the light is. That is, in the X direction, an optical path $\phi 1$ of the light in the liquid crystal molecules corresponding to the first strip-shaped sub-electrode 521 is less than an optical path $\phi 2$ of the light in the liquid crystal molecules corresponding to the second strip-shaped sub-electrode 522, which is less than an optical path $\phi 3$ of the light in the liquid crystal molecules corresponding to the third strip-shaped sub-electrode 523, which is less than an optical path $\phi 4$ of the light in the liquid crystal molecules corresponding to the fourth strip-shaped sub-electrode 524.

Figure 3:
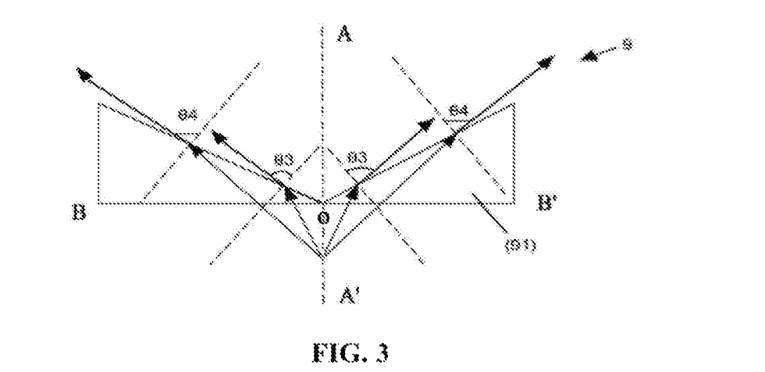
FIG. 3 is a schematic diagram of an equivalent lens structure for a portion of a refractive index adjustment mechanism in FIG. 2 in a pixel unit according to an embodiment of the present disclosure.

Based on the above optical paths in the pixel unit 8, the refractive index adjustment mechanism 5 in the pixel unit 8 may be equivalent to a lens structure 9 as shown in FIG. 3. The lens structure 9 includes two lenses 91 arranged symmetrically with respect to a line AA', a shape of each of the two lenses 91 is a right triangle, vertexes O corresponding to smaller acute angles of the two lenses 91 are coincident with each other and arranged in the line AA', and longer right-angle sides of the two lenses 91 are in a line BB', which is perpendicular to the line AA', as shown in FIG. 3. In a direction from a point O to each of points B and B', the refraction angles of the rays in the light exiting from the lens 91 gradually increase (for example, θ4 is greater than θ3), thus making the light passing through the first opening 32 deflect towards the X direction greater, such that more light may exit from the second openings 42, thereby improving the brightness of the display screen.

Figure 4:
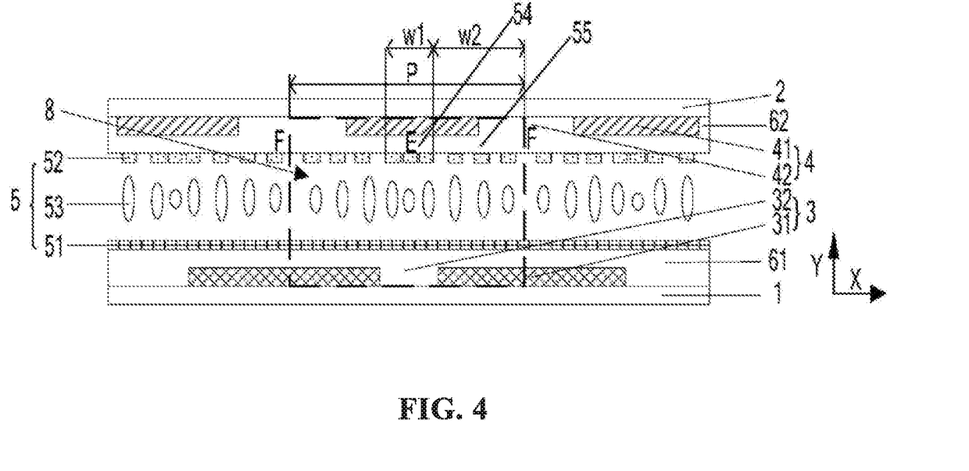
FIG. 4 is a schematic diagram of a display panel in a power-on state according to an embodiment of the present disclosure.

FIG. 4 is a schematic diagram of a display panel in the power-on state according to an embodiment of the present disclosure, which shows an exemplary structure and a driving method for the second electrode 52. The second electrode 52 includes a first region 54 and second regions 55 in a pixel unit 8, a center of the first region 54 and a center of the second shading portion 41 closest to the first region 54 are in a same straight line along the light output direction (the Y direction), the second region 55 ranges from a right edge of the first region 54 to a right edge of the pixel unit 8. An interval between two adjacent strip-shaped sub-electrodes of the second electrode 52 in the first region 54 is less than an interval between two adjacent strip-shaped sub-electrodes 52 of the second electrode 52 in the second region 55. In a direction from a center of the pixel unit 8 to an edge of the pixel unit 8 (from the first location E to the second location F), voltages applied to the strip-shaped sub-electrode in the first region 54 gradually increase and voltages applied to the strip-shaped sub-electrode in the second region 55 gradually decrease, such that refractive indexes in the light output direction (in the Y direction) of the liquid crystal molecules first gradually increase in the first region 54 and then gradually decrease in the second region 55, while refractive indexes in a direction (in the X direction) perpendicular to the light output direction first gradually decrease in the first region 54 and then gradually increase in the second region 55, so that optical paths in the X direction of the light in the liquid crystal molecules first gradually decrease and then gradually increase, thereby causing more light to exit from the two adjacent second openings 42.

As enclosed by dotted lines shown in FIG. 4, a pixel unit 8 includes one first region 54 and two second regions 55, the first region 54 is located in the middle of the pixel unit 8, the two second regions 55 are located at both sides of the first region 54, and a width w1 of the first region 54 is less than a width w2 of the second region 55.

Figure 5:
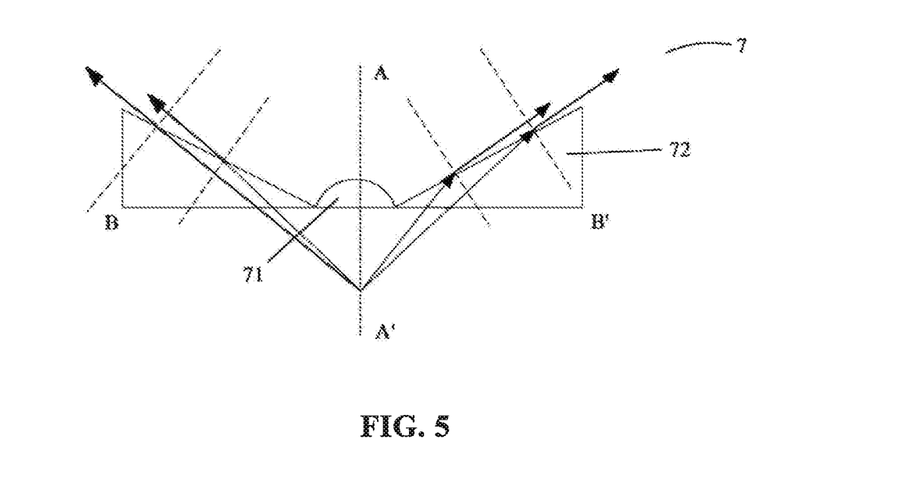
FIG. 5 is a schematic diagram of an equivalent lens structure of a portion of a refractive index adjustment mechanism in FIG. 4 in a pixel unit according to the embodiments of the present disclosure.

A distribution of the optical paths in the pixel unit 8 may be obtained from the above equations (2) and (3). Accordingly, based on the distribution of the optical paths in the pixel unit 8, the refractive index adjustment mechanism 5 in the pixel unit 8 may be equivalent to a lens structure 7 as shown in FIG. 5. The lens structure 7 includes one lens 71 which is a convex lens and symmetrical with respect to a line AA', and two lenses 72 which are arranged at both sides of the lens 71 symmetrically with respect to the line AA', a shape of the lens 72 is a right triangle, and longer right-angle sides of the lenses 72 are in a line BB', which is perpendicular to the line AA', as shown in FIG. 5. Since the lens 71 is a convex lens and has a small size, the light through the first opening 32 may diffract when passing through the lens 71, such that the light deflect towards the X direction greater, thereby increasing an amount of rays in the light from the first opening 32 to the two second openings 42 closest to the first opening 32, thereby improving the brightness of the display screen.

It is noted that, in the embodiment of the present disclosure, a width of the first region 54 is not limited herein and may be set according to an actual pixel structure. It is known for a person skilled in the art that, a structure and a driving method of any type of the second electrode 52 should be within the protection scope of the present disclosure based on the above inventive concept.

Figure 6:
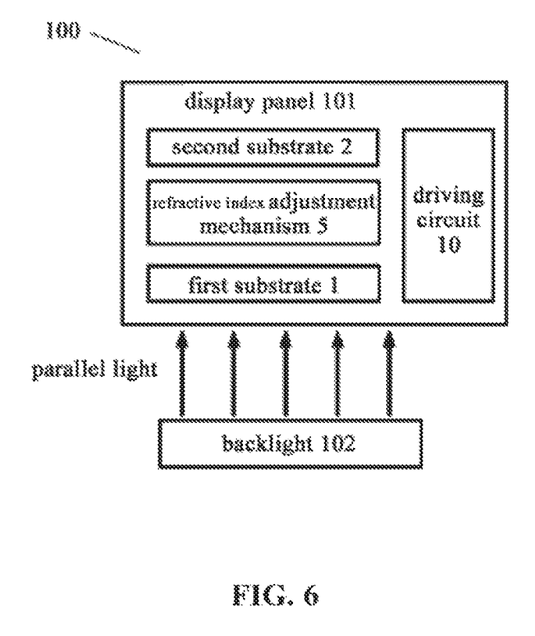
FIG. 6 is a schematic block diagram of a display apparatus including a display panel according to an embodiment of the present disclosure.

FIG. 6 is a schematic block diagram of a display apparatus including the display panel according to the embodiment of the present disclosure. An embodiment of the present disclosure provides a display apparatus 100, including a backlight 102 and the display panel 101 as mentioned above. The backlight 102 is located at a side of the first substrate 1 distal to the second substrate 2, for providing light to the display panel 101. FIG. 6 further shows a driving circuit 10, which applies voltages to the first and second electrodes 51, 52 of the refractive index adjustment mechanism 5, thereby generating the electric fields, such that more light exits from the display panel after passing through the refractive index adjustment mechanism 5.

The display apparatus may be any product or component having a function of liquid crystal display such as an electronic paper, a mobile phone, a tablet PC, a television, and a digital photo frame.

It should be understood that, the above embodiments are only exemplary embodiments used for illustrating the principle of the present disclosure. However, the present disclosure is not limited thereto. Obviously, those skilled in the art can make various modifications and variants to this disclosure without departing from spirit and scope of this disclosure. As such, if these modifications and variants of this disclosure fall within the protection scope of the claims, the present disclosure intends to include these modifications and variants.

What is claimed is:

1. A display panel, comprising: a first substrate, a refractive index adjustment mechanism and a second substrate successively arranged along a light output direction, wherein a first black matrix is formed on the first substrate, the first black matrix comprises a plurality of first shading portions and a plurality of first openings among the plurality of first shading portions; a second black matrix is formed on the second substrate, the second black matrix comprises a plurality of second shading portions and a plurality of second openings among the plurality of second shading portions, wherein the plurality of first shading portions are configured to be arranged opposite to the plurality of second openings in the light output direction, respectively, and the plurality of second shading portions are configured to be arranged opposite to the plurality of first openings in the light output direction, respectively;

wherein the refractive index adjustment mechanism is configured to adjust an amount of light exiting from at least one of two second openings closest to a first opening from which the light is incident; and an orthographic projection of one of the plurality of second shading portions on the first substrate completely covers an orthographic projection of its corresponding one of the plurality of first openings on the first substrate, and an orthographic projection of one of the plurality of first shading portions on the second substrate completely covers an orthographic projection of its corresponding one of the plurality of second openings on the second substrate;

wherein the first substrate, the refractive index adjustment mechanism and the second substrate are substantially parallel to each other;

wherein the refractive index adjustment mechanism comprises a first electrode, a second electrode and a liquid crystal layer arranged between the first electrode and the second electrode wherein the first electrode is arranged between the first black matrix and the liquid crystal layer, and the second electrode is arranged between the second black matrix and the liquid crystal layer;

wherein the first electrode comprises a plate-shaped electrode, and the second electrode comprises a plurality of strip-shaped sub-electrodes;

wherein an intensity of an electric field between the plurality of strip-shaped sub-electrodes and the first electrode is controlled to cause liquid crystal molecules in the liquid crystal layer to deflect, for adjusting refractive index of the liquid crystal molecules between the plurality of strip-shaped sub-electrodes and the first electrode, such that all light exiting from the liquid crystal layer along different directions exits from the plurality of second openings; and wherein a width b of each of the plurality of second shading portions meets:

$$b \geq a + 2*h*\tan\theta_1,$$

where a is a width of each of the plurality of first openings; h is a distance between the first black matrix and the second black matrix in the light output direction; $\theta_1$ is an angle between an incident light passing through the first opening and an output light deflected by liquid crystal molecules in the liquid crystal layer in an original state when the display panel is in a power-off state.

2. The display panel of claim 1, wherein a center of the first opening and a center of its corresponding second shading portion are in a same straight line in the light output direction.

3. The display panel of claim 1, wherein the first black matrix is arranged between the first substrate and the refractive index adjustment mechanism, and/or the second black matrix is arranged between the second substrate and the refractive index adjustment mechanism.

4. The display panel of claim 1, wherein a is in a range of from 3 μm to 20 μm.

5. The display panel of claim 4, further comprising a driving circuit for applying a voltage between the first electrode and the second electrode.

6. The display panel of claim 1, wherein the liquid crystal molecules in the liquid crystal layer are blue phase liquid crystal molecules.

7. The display panel of claim 6, wherein the plurality of strip-shaped sub-electrodes are distributed uniformly.

8. The display panel of claim 7, wherein voltages applied to the strip-shaped sub-electrodes between centers of two adjacent second openings gradually decrease in each of two directions from a center of the second shading portion between the two adjacent second openings to centers of the two adjacent second openings.

9. The display panel of claim 7, wherein an interval between the centers of the two adjacent second openings is in a range from 30 μm to 300 μm.

10. The display panel of claim 1, wherein
a cell region between centers of two adjacent second openings is divided into a first region having a first width and two second regions each having a second width;
the first region is in the middle of the cell region, the two second regions are symmetrically located at both sides of the first region, and the first width is less than the second width; and
the strip-shaped sub-electrodes are distributed uniformly in the first region in a first density and are distributed uniformly in the second regions in a second density, and the first density is larger than the second density.

11. The display panel of claim 10, wherein voltages applied to the strip-shaped sub-electrodes in the first region gradually increase in directions from a center of the first region to edges of the first region, while voltages applied to the strip-shaped sub-electrodes in the second region gradually decrease in a direction from the edge of the first region to a center of the second opening closest thereto.

12. The display panel of claim 1, wherein a first planarization layer is provided between the first electrode and the first black matrix.

13. The display panel of claim 1, wherein a second planarization layer is provided between the second black matrix and the second electrode.

14. A display apparatus, comprising:
a backlight; and
the display panel as claimed in claim 1,
wherein the backlight is located at a side of the first substrate distal to the second substrate, for providing light to the display panel.

* * * * *